(12) United States Patent
Ohto (10) Patent No.: US 12,147,118 B1
(45) Date of Patent: Nov. 19, 2024

(54) PLANAR ILLUMINATION DEVICE

(71) Applicant: MINEBEA MITSUMI Inc., Nagano (JP)

(72) Inventor: Kazuki Ohto, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/688,412

(22) PCT Filed: Jul. 12, 2022

(86) PCT No.: PCT/JP2022/027432
§ 371 (c)(1),
(2) Date: Mar. 1, 2024

(87) PCT Pub. No.: WO2023/032476
PCT Pub. Date: Mar. 9, 2023

(30) Foreign Application Priority Data

Sep. 6, 2021 (JP) ................................. 2021-144839

(51) Int. Cl.
*G02F 1/00* (2006.01)
*G02F 1/13357* (2006.01)

(52) U.S. Cl.
CPC .. *G02F 1/133606* (2013.01); *G02F 1/133603* (2013.01); *G02F 1/133605* (2013.01)

(58) Field of Classification Search
None
See application file for complete search history.

(56) References Cited

U.S. PATENT DOCUMENTS 11,175,016 B2    11/2021  Mukumoto et al.
2014/0268868 A1*  9/2014  Hatta ................ G02F 1/133606
                                                              362/606

(Continued)

FOREIGN PATENT DOCUMENTS

JP        2010-015918 A    1/2010
JP        2011-228230 A   11/2011
(Continued)

OTHER PUBLICATIONS

International Search Report for corresponding International Application No. PCT/JP2022/027432 mailed Sep. 6, 2021.
(Continued)

*Primary Examiner* — Gerald J Sufleta, II
(74) *Attorney, Agent, or Firm* — Pearne & Gordon LLP (57) ABSTRACT

A planar illumination device of an embodiment includes substrates, a reflector plate, and a plurality of optical sheets. The substrates are provided with a plurality of light sources and have a planar shape or a curved shape. The reflector plate is disposed on the substrates and has reflection surfaces surrounding the light sources. The plurality of optical sheets is disposed at the emission side of the reflector plate. The reflector plate includes flat parts on one side of a frame of the reflector plate. The optical sheets include respective a fixing region. The fixing region of the optical sheets is fixed to the flat parts. The flat parts on the side are sandwiched between both sides respectively provided with a pin protruding in a thickness direction. The optical sheets are provided with holes at positions corresponding to the pins to engage with the pins.

11 Claims, 8 Drawing Sheets

(56) References Cited

U.S. PATENT DOCUMENTS

2021/0190294 A1* 6/2021 Mukumoto ............... F21V 5/04
2021/0364857 A1* 11/2021 Ogawa .............. G02F 1/133605
2024/0280243 A1* 8/2024 Kusunoki ................. F21S 2/00

FOREIGN PATENT DOCUMENTS

| JP | 2013-015768 A | 1/2013 |
| JP | 2017-220300 A | 12/2017 |
| WO | 2020/054602 A1 | 3/2020 |

OTHER PUBLICATIONS

Written Opinion for corresponding International Application No. PCT/JP2022/027432 dated Sep. 6, 2021.

International Search Report for corresponding International Application No. PCT/JP2022/027432 dated Sep. 6, 2022 (date has been corrected—previously submitted on Mar. 1, 2024).

English translation of the Written Opinion for corresponding International Application No. PCT/JP2022/027432 mailed Sep. 6, 2022.

* cited by examiner

PLANAR ILLUMINATION DEVICE

CROSS REFERENCE TO RELATED APPLICATIONS

This application is a national stage entry of International Application No. PCT/JP2022/027432, filed on Jul. 12, 2022, which claims priority to Japanese Patent Application 2021-144839, filed on Sep. 6, 2021, which is incorporated herein by reference.

TECHNICAL FIELD

The disclosure relates to a planar illumination device.

BACKGROUND

A known so-called direct planar illumination device includes an optical sheet disposed at the emission side of a substrate provided with a plurality of light sources (see, for example, Japanese Patent Application Laid-Open No. 2010-15918 and Japanese Patent Application Laid-Open No. 2013-15768).

The optical sheet is fixed at a frame of a bottom base frame and the like by bonding the end part of the optical sheet with a double-sided tape and the like. The necessity of fixing the optical sheet is to prevent generation of noise (rattle noise) when vibration is applied to the planar illumination device due to movement of the optical sheet, prevent an end of the optical sheet from being visible from the emission surface side, or prevent degradation of the optical characteristics due to the wrinkled optical sheet and the like.

SUMMARY

Unfortunately, a plurality of optical sheets is typically provided in many cases, and thus the order of attaching and the attaching direction of the optical sheets are likely to be mistaken during assembling, leading to poor workability. In a case of a structure of simply stacking and fixing the optical sheet with a double-sided tape and the like at the frame of the bottom base frame and the like, the thickness of the double-sided tape and the like is added, thus increasing the thickness of the planar illumination device.

In view of the above, an object of the disclosure is to provide a planar illumination device having easy assembling and allowing for being thinned.

To solve the above-described problems and achieve the object, a planar illumination device according to an aspect of the disclosure includes a substrate, a reflector plate, and a plurality of optical sheets. The substrate is provided with a plurality of light sources and has a planar shape or a curved shape. The reflector plate is disposed on the substrate and has a reflection surface surrounding the light source. The plurality of optical sheets is disposed at the emission side of the reflector plate. The reflector plate includes flat parts on one side of a frame of the reflector plate. The optical sheets respectively include a fixing region. The fixing region of the optical sheets is fixed to the flat parts. The flat parts on the side are sandwiched between both sides respectively provided with a pin protruding in a thickness direction. The optical sheets are provided with holes at positions corresponding to the pins to engage with the pins.

The planar illumination device according to an aspect of the disclosure has easy assembling and allowing for being thinned.

DESCRIPTION OF EMBODIMENTS

A planar illumination device according to an embodiment is described below with reference to the drawings. Note that the disclosure is not limited to the embodiment. Furthermore, the dimensional relationships between elements, proportions of the elements, and the like in the drawings may differ from reality. The drawings may include parts having mutually different dimensional relationships and proportions. Furthermore, the contents described in one embodiment or modification examples are applied in principle to other embodiments or modification examples.

Figure 1:
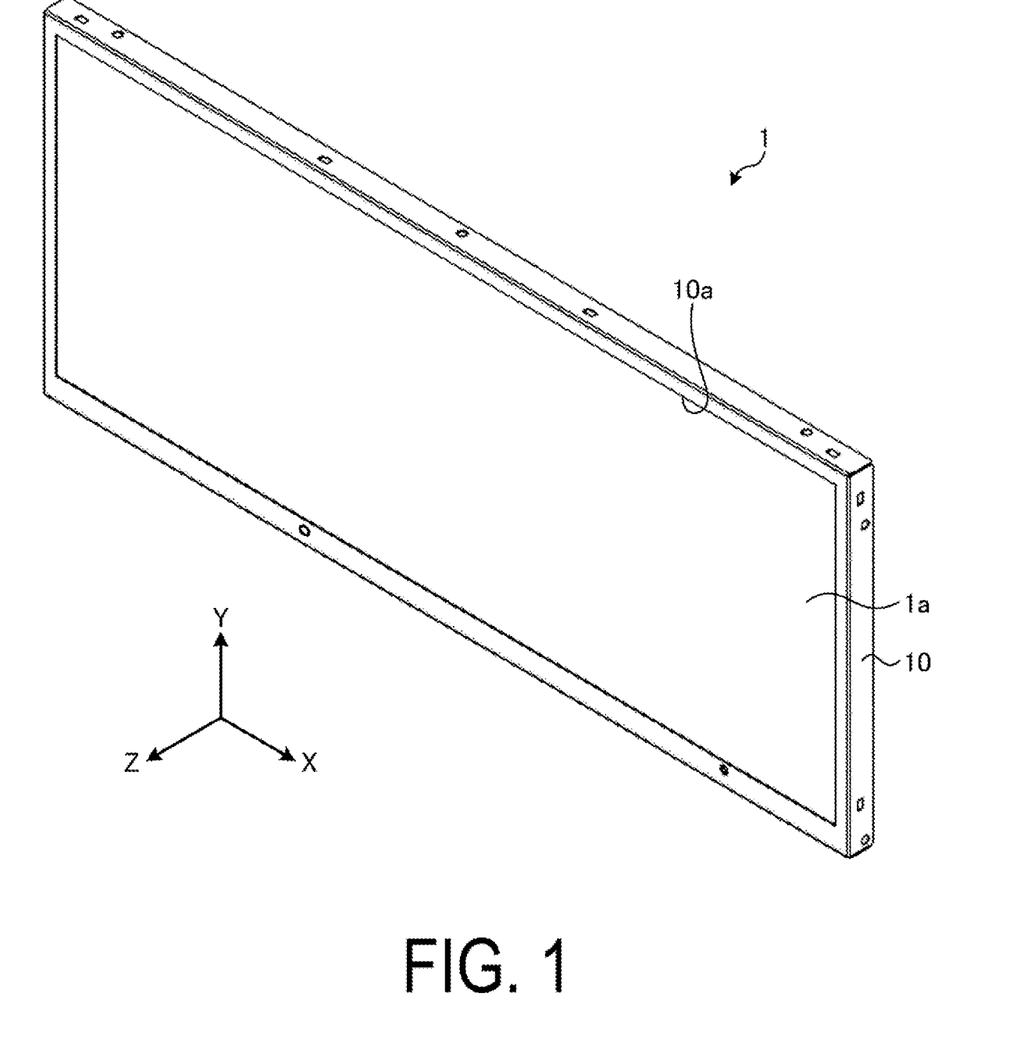
FIG. 1 is a perspective view including an external appearance of a planar illumination device according to an embodiment.

FIG. 1 is a perspective view including an external appearance of a planar illumination device 1 according to an embodiment. In the drawing for convenience, the longitudinal direction of the planar illumination device 1 is the X-axis direction, the short direction is the Y-axis direction, and the thickness direction is the Z-axis direction.

In FIG. 1, the planar illumination device 1 has a substantially rectangular (or substantially square) and a substantially plate-like external shape and has a housing composed of a bottom base frame (hidden at the rear side in the drawing) having a bottomed box shape accommodating a substrate and the like described later and a top frame 10 covering the opening side of the bottom base frame. An emission surface 1a is formed by an opening 10a having a substantially rectangular in the top frame 10, causing light to be emitted from the inside toward the outside of the planar illumination device 1. In the case where the planar illumination device 1 is used as a backlight of in-vehicle navigation devices, indicators and the like, the liquid crystal display device and the like are mounted on the emission surface 1a side.

Figure 2:
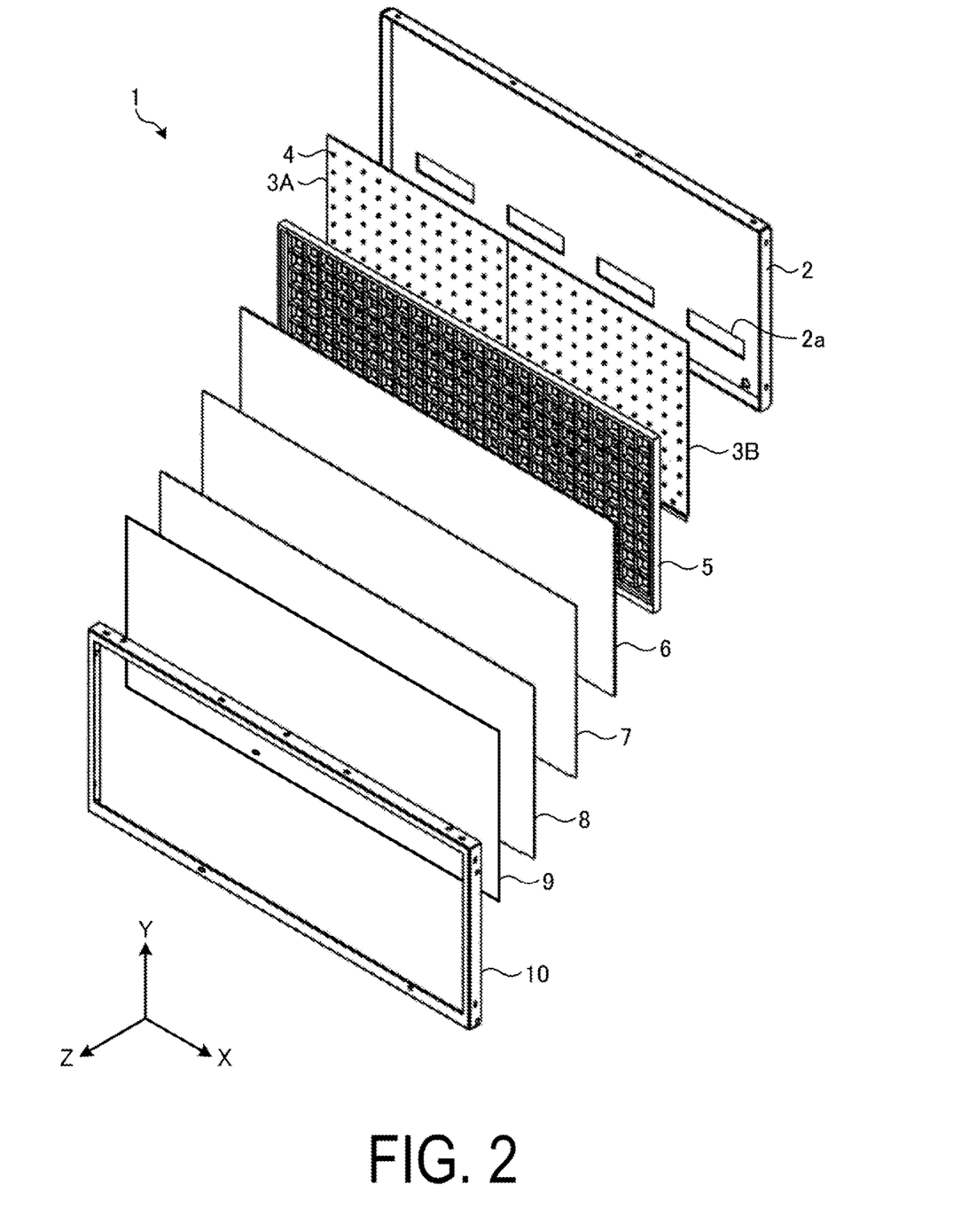
FIG. 2 is an exploded perspective view illustrating a main part of the planar illumination device.

FIG. 2 is an exploded perspective view illustrating a main part of the planar illumination device 1 as viewed from the emission surface side as in FIG. 1. In FIG. 2, in the planar illumination device 1, substrates 3A and 3B provided with a plurality of (a large number of) light sources 4, a reflector plate 5, a diffuser plate 6, and optical sheets 7 to 9 are attached to a bottom base frame 2, and the top frame 10 fits to the bottom base frame 2 in a covering manner.

The bottom base frame 2 includes a bottom part, and side walls of the four sides provided at the outer periphery of the bottom part. A connector insertion hole 2a for passing an electrical connector (not illustrated) provided at the rear surfaces of the substrates 3A and 3B is provided at the bottom part. The bottom base frame 2 is formed of a die casting, a sheet metal and the like. A reflection member composed of a reflection tape or the like is bonded inside the side wall of the bottom base frame 2. The reflection tape is a belt-shaped member with a reflection layer formed on one surface and an adhesive layer formed on the other surface.

The substrates 3A and 3B are fixed inside the bottom part of the bottom base frame 2 through a fixing member (not illustrated) composed of a double-sided tape or the like. The light source 4 composed of a plurality of (a large number of) light emitting diodes (LEDs) or the like is disposed in a grid form on the substrates 3A and 3B.

The rear surface of the reflector plate 5 is fixed between the light sources 4 on the substrates 3A and 3B through a fixing member (not illustrated) composed of a plurality of belt-shaped double-sided tapes or the like extending in the left-right direction (or the up-down direction). The reflector plate 5 has a reflection surface surrounding each light source 4 and is for increasing the luminance by reflecting, to the emission surface side, the light emitted in a wide-angle from the light source 4. The reflection surface of the reflector plate 5 includes substantially rectangular hole parts having the light sources 4 disposed protruding and a plurality of tilted reflection surfaces surrounding the hole part and opening toward the emission surface side. The reflector plate 5 is produced by injection molding of resins and the like.

The end part of the diffuser plate 6 and the end parts of the optical sheets 7 to 9 are sequentially fixed to one side (in the drawing, the side at the lower side) of the frame of the reflector plate 5, and thus the diffuser plate 6 and the optical sheets 7 to 9 are stacked at the reflector plate 5. The diffuser plate 6 is also called diffusion sheet (diffusion film) or diffusion plate, and uniforms the luminance by diffusing light from the light source 4 and the reflector plate 5. The optical sheet 7 is, for example, a prism sheet such as a BEF (a luminance lifting film available from 3M). The optical sheet 8 is, for example, a prism sheet such as a BEF (a luminance lifting film available from 3M). The optical sheet 9 is, for example, a louver film (louver sheet) transmitting only light traveling in a predetermined direction.

The top frame 10 is disposed at the emission surface side of the optical sheet 9, and the top frame 10 is fixed to the bottom base frame 2. The top frame 10 is formed of a die casting, a sheet metal and the like.

The planar illumination device 1 having a planar shape is illustrated in the drawing, but the planar illumination device 1 may have a curved shape. In this case, for example, the bottom base frame 2, the substrates 3A and 3B, the reflector plate 5, the top frame 10 and the like are formed in a curved shape. The diffuser plate 6 and the optical sheets 7 to 9 are deformed in a curved shape at the time of assembling.

Figure 3:
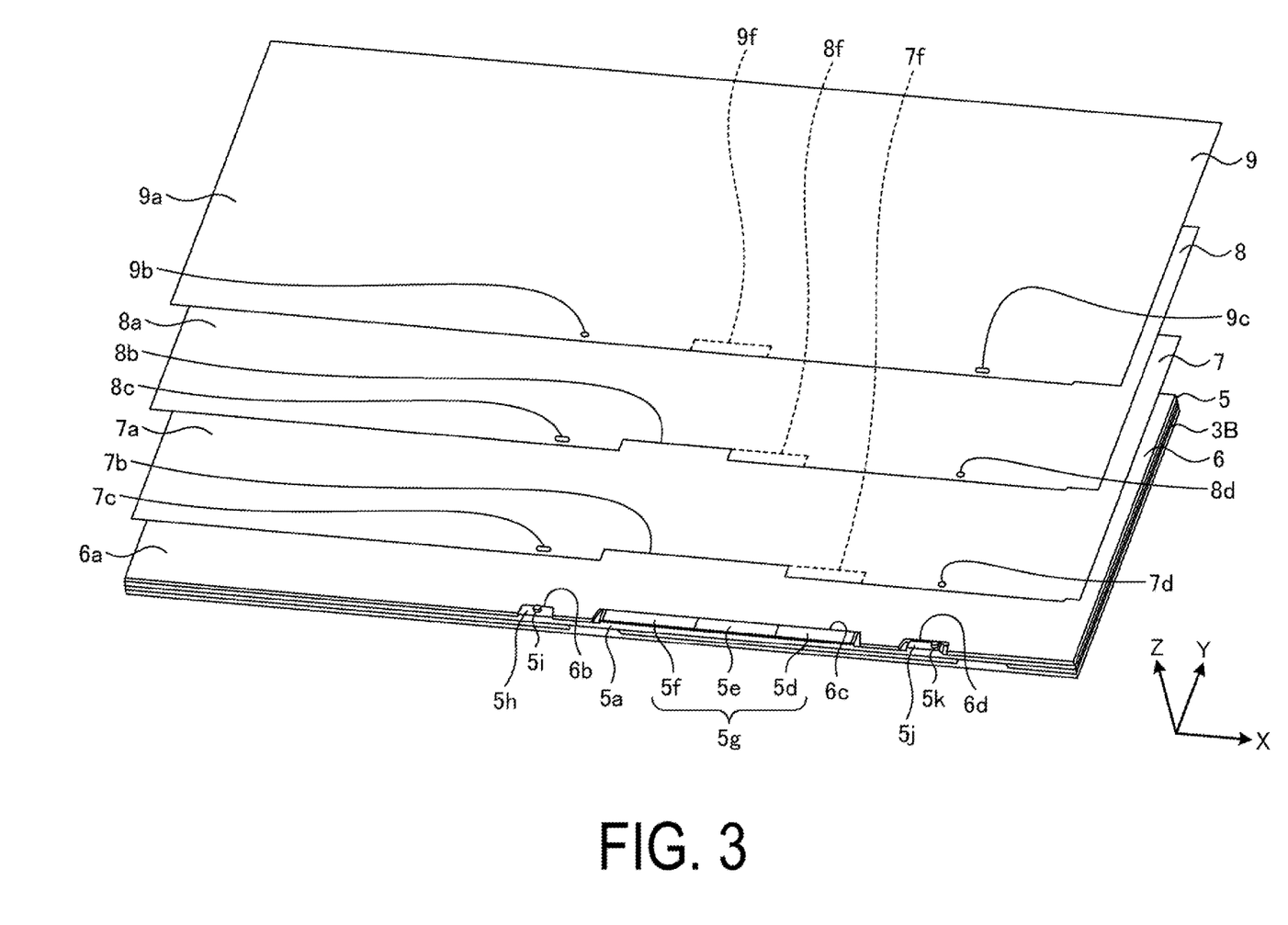
FIG. 3 is a diagram illustrating a state of a diffuser plate and an optical sheet being stacked and fixed at a reflector plate.
Figure 4:
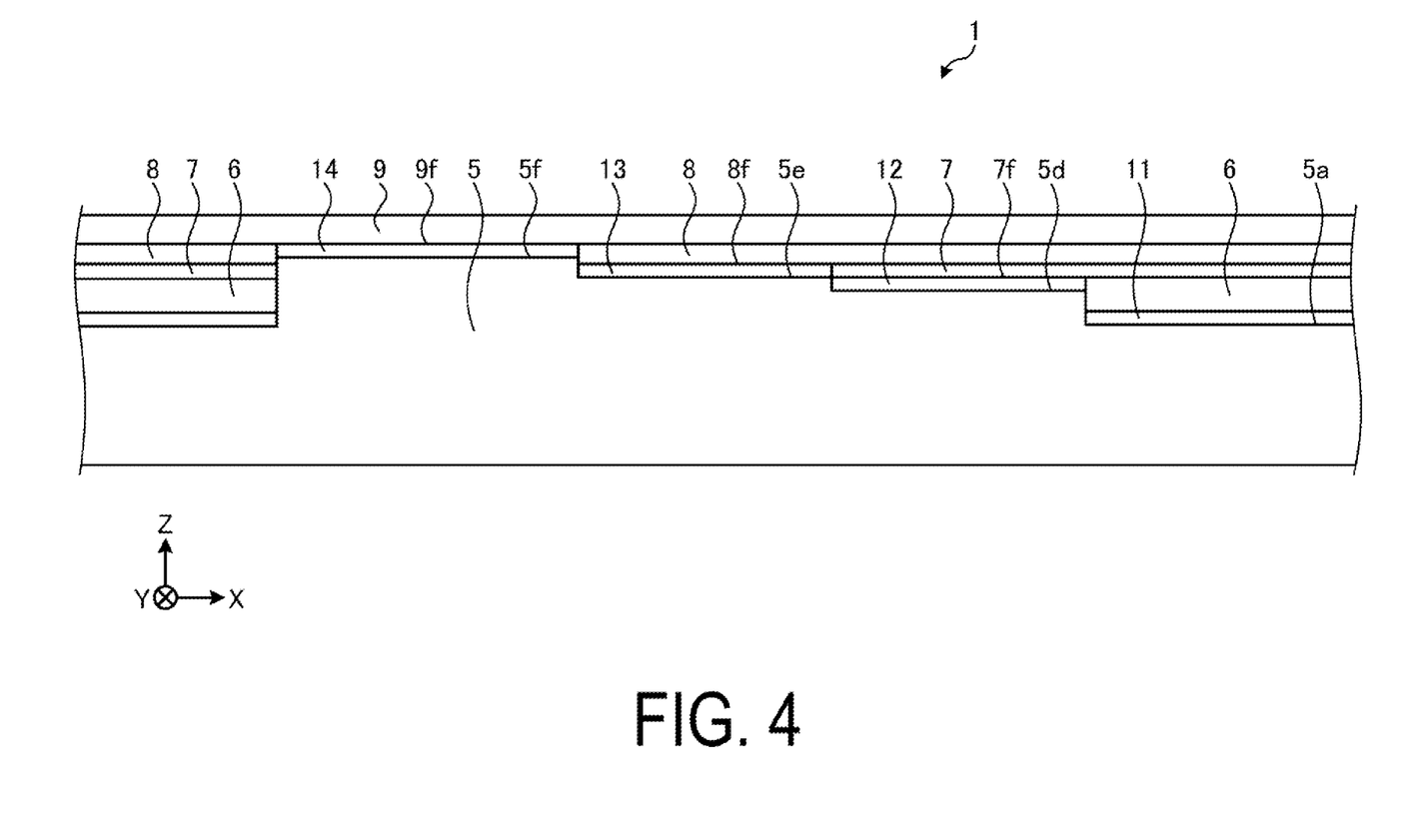
FIG. 4 is a front view illustrating a state of the diffuser plate and the optical sheet having been stacked and fixed at the reflector plate.

FIG. 3 is a diagram illustrating a state of the diffuser plate 6 and the optical sheets 7 to 9 being stacked and fixed at the reflector plate 5. FIG. 4 is a front view (as viewed from the Y-axis direction) illustrating a state of the diffuser plate 6 and the optical sheets 7 to 9 having been stacked and fixed at the reflector plate 5.

In FIGS. 3 and 4, a frame 5a of a lower side in the reflector plate 5 in the drawing is provided with a step part 5g from an approximate center of the side to the right side in the drawing. The step part 5g includes a plurality of flat parts 5d to 5f having different heights in the thickness direction, namely the flat part 5d having the smallest height, a flat part 5e at one step up from the flat part 5d, and the flat part 5f at one step further up from the flat part 5e.

An end part of a plate body 6a of the diffuser plate 6 is fixed at a part adjacent to the step part 5g of the frame 5a of the reflector plate 5 through a fixing member 11 such as a double-sided tape. A substantially rectangular notch part 6c is provided at the part overlapping the step part 5g at the end part of the plate body 6a, causing the end part of the plate body 6a not to cover the step part 5g.

A fixing region 7f of an end part of a sheet body 7a of the optical sheet 7 is fixed at the flat part 5d of the step part 5g through a fixing member 12 such as a double-sided tape. A notch part 7b is provided adjacent to the fixing region 7f at the center side of the side. In the notch part 7b, the part overlapping fixing regions 8f and 9f of the end parts of sheet bodies 8a and 9a of other optical sheets 8 and 9 stacked at the emission side is cut out. This allows the sheet body 7a not to cover the flat parts 5e and 5f of the step part 5g. The height of the flat part 5d is obtained by subtracting the thickness of the fixing member 12 from the sum of the thickness of the fixing member 11 and the thickness of the diffuser plate 6 added to the frame 5a, causing the height of the plate body 6a at the emission side and the height of the fixing member 12 at the emission side to be substantially the same and the sheet body 7a to be stacked in a flat manner on the plate body 6a and the fixing member 12.

The fixing region 8f of the end part of the sheet body 8a of the optical sheet 8 is fixed at the flat part 5e of the step part 5g through a fixing member 13 such as a double-sided tape. A notch part 8b is provided adjacent to the fixing region 8f at the center side of the side. In the notch part 8b, the part overlapping the fixing region 9f of the end part of the sheet body 9a of other optical sheet 9 stacked at the emission side is cut out. This allows the sheet body 8a not to cover the flat part 5f of the step part 5g. The height of the flat part 5e is a height obtained by adding the thickness of the fixing member 12 to the height of the adjacent flat part 5d, causing the height of the fixing member 13 at the emission side and the height of the sheet body 7a at the emission side to be substantially the same and the sheet body 8a to be stacked in a flat manner on the fixing member 13 and the sheet body 7a.

The fixing region 9f of the end part of the sheet body 9a of the optical sheet 9 is fixed at the flat part 5f of the step part 5g through a fixing member 14 such as a double-sided tape. The sheet body 9a of the optical sheet 9 has no other optical sheet stacked at the emission side, and thus the notch part is not provided. The height of the flat part 5f is a height obtained by subtracting the thickness of the fixing member 14 from the sum of the thickness of the fixing member 13 and the thickness of the sheet body 8a added to the height of the adjacent flat part 5e, causing the height of the fixing member 14 at the emission side and the height of the sheet body 8a at the emission side to be substantially the same and the sheet body 9a to be stacked in a flat manner on the fixing member 14 and the sheet body 8a.

In other words, the heights of the flat parts 5d to 5f of the step part 5g are respectively obtained by subtracting the thicknesses of the fixing members 12 to 14 from the heights of the surfaces of the directly stacked optical sheets 7 to 9 at the incident side (the side opposite to the emission side), and in this case, the thicknesses of the fixing members 12 to 14 are canceled, and, the sum of thicknesses of the optical sheets 7 to 9 is minimized. Even when the above-described condition of the heights of the flat parts 5d to 5f is not exactly satisfied, the thickness can be reduced in comparison with the case where the optical sheet is simply stacked and fixed by means of a fixing member.

In this manner, the fixing regions 7f to 9f of the end parts of the sheet bodies 7a to 9a of the optical sheets 7 to 9 are fixed at the flat parts 5e to 5f of the step part 5g, and the flat parts 5e to 5f of the step part 5g and the notch parts 7b and 8b of the optical sheets 7 to 9 have characteristic shapes, improving the workability by reducing errors of the order, the front and rear, and the orientation at the time of assembling of the optical sheets 7 to 9. The fixing members 12 to 14 such as a double-sided tape are used for fixing, and the fixing operation is easily performed.

The thicknesses of the fixing members 12 to 14 for fixing the optical sheets 7 to 9 are canceled by the step part 5g, and the minimum thicknesses is only the sum of the optical sheets 7 to 9, allowing the planar illumination device 1 to be thinned. For example, in the case where the fixing members 12 to 14 are double-sided tapes, and each thickness is, for example, 0.15 mm, the thickness can be reduced by a total of 0.45 mm (equals to 0.15 mm×3).

The step part 5g is provided at one side from the approximate center of the side provided with the step part 5g of the reflector plate 5, and the heights of the flat parts 5e to 5f decrease toward the outside from an approximate center side. This allows the optical sheet 9 typically having a largest linear expansion coefficient and provided outermost to be fixed at the approximate center of the side, the expansion and contraction to be dispersed to the left and right ends with respect to the center, and the clearance between the bottom base frame 2 and the optical sheet 9 to be made appropriate. The optical sheet 9 provided outermost as described above is a louver film with a linear expansion coefficient of about $80 \times 10^{-6}/°$ C., for example. The prism sheets of other optical sheets 8 and 7 have a linear expansion coefficient of about $25 \times 10^{-6}/°$ C., for example. If an optical sheet having a large linear expansion coefficient is freely expanded and contracted without using a center reference, the end of the optical sheet may be brought into the effective light emission area and reflected in the LCD screen at the contraction, or the end of the optical sheet may hit the bottom base frame 2 to generate wrinkles or cause positional displacement at the expansion.

Figure 5:
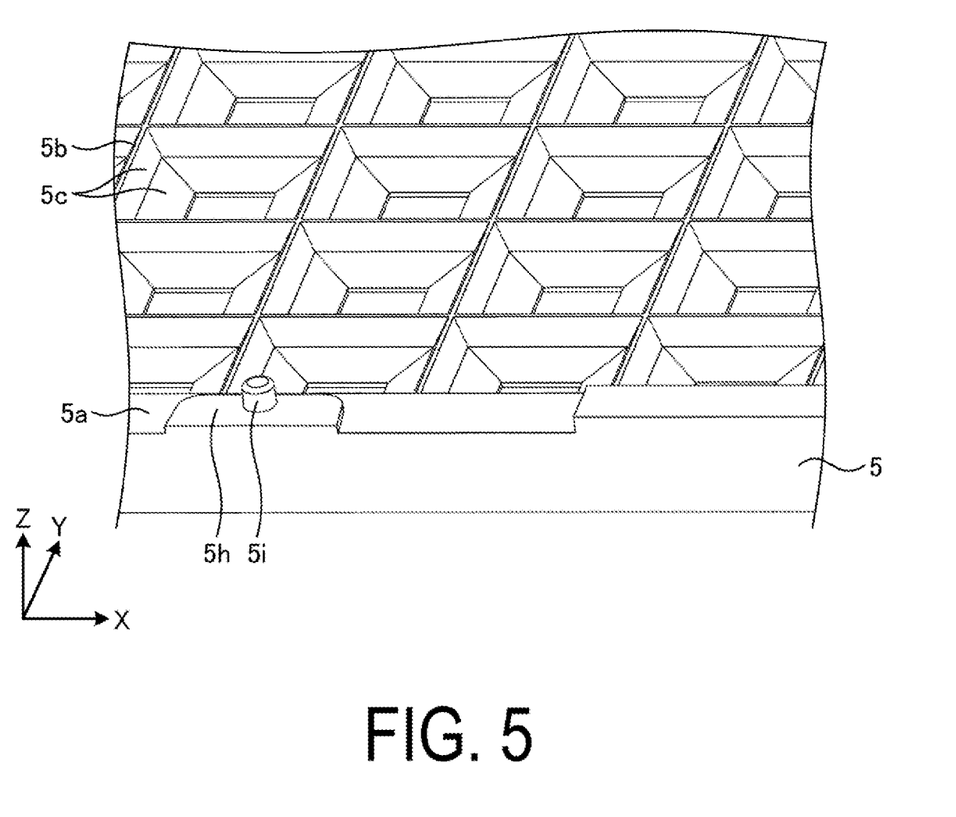
FIG. 5 is a perspective view illustrating a region around one pin of a reflector plate.
Figure 6:
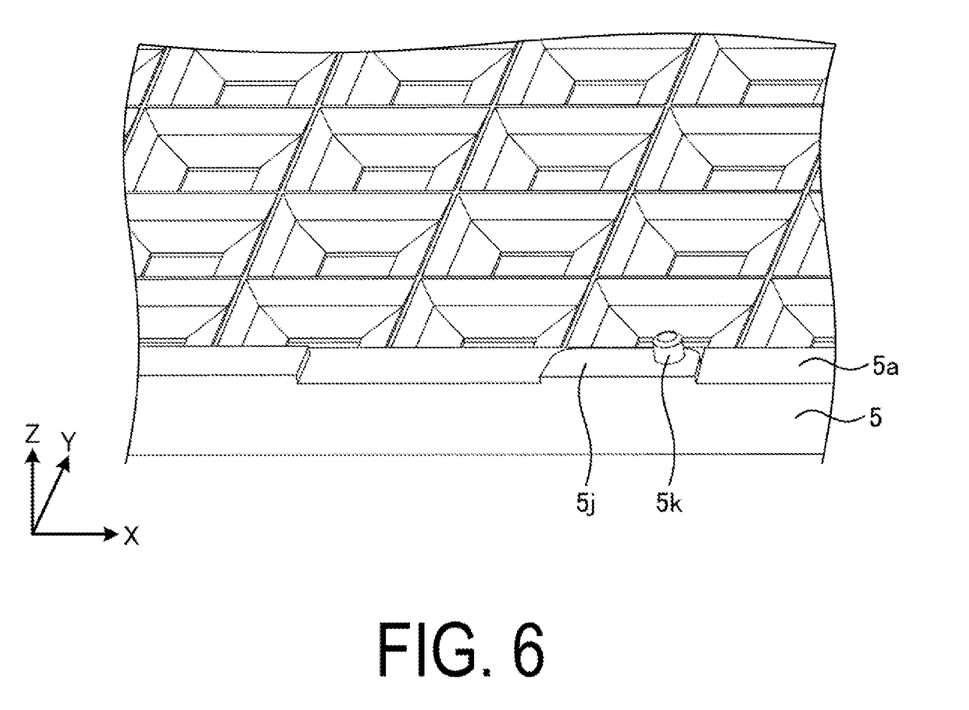
FIG. 6 is a perspective view illustrating a region around another pin of the reflector plate.

On the other hand, in FIG. 3, the frame 5a of the reflector plate 5 is provided with a pin 5i at an approximate center part of the side and a pin 5k at the end part side, and the step part 5g is sandwiched between the approximate center part and the end part side. FIG. 5 is a perspective view illustrating a region around one pin 5i of the reflector plate 5. FIG. 6 is a perspective view illustrating a region around the other pin 5k of the reflector plate 5.

In FIGS. 3, 5, and 6, a protruding part 5h is provided at the approximate center side of the side of the frame 5a of the reflector plate 5, and the pin 5i having a columnar shape protruding in the thickness direction is provided on the protruding part 5h. A protruding part 5j is provided at the end part side of the pin 5i, the step part 5g is sandwiched between the end part side and the pin 5i, and the pin 5k having a columnar shape protruding in the thickness direction is provided on the protruding part 5j. For the purpose of preventing the interference with the protrusions 5h and 5j, notch parts 6b and 6d are provided at the end part of the plate body 6a of the diffuser plate 6. The reflector plate 5 is provided with a wall 5b dividing the segments for each light source 4 and a reflection surface 5c in each segment.

Holes 7c and 7d are provided at positions corresponding to the pins 5i and 5k in the sheet body 7a of the optical sheet 7, holes 8c and 8d are provided for the sheet body 8a of the optical sheet 8, and holes 9b and 9c are provided for the sheet body 9a of the optical sheet 9. The holes 7c and 7d, the holes 8c and 8d, and the holes 9b and 9c are engaged with the pins 5i and 5k. This can use the pins 5i and 5k as targets when placing the optical sheets 7 to 9 at the time of assembling, thus improving the workability. Since the two pins 5i and 5k set the positions of the optical sheets 7 to 9, the positional displacement of the optical sheets 7 to 9 can be prevented, and even when the optical sheets 7 to 9 are repeatedly expanded and contracted due to temperature change, the positional displacement less occurs.

The hole 9b disposed at the approximate center side in the outermost optical sheet 9 has a circular shape with a predetermined clearance with respect to the outer diameter of the pin 5i, and the hole 9c at the end part side has an elliptical shape elongated in the extending direction of the side with a predetermined clearance with respect to the outer diameter of the pin 5k. The holes 8c and 7c located at the approximate center sides in the optical sheets 8 and 7 have an elliptical shape elongated in the extending direction of the side with a predetermined clearance with respect to the outer diameter of the pin 5i, and the holes 8d and 7d at the end part side have a circular shape with a predetermined clearance with respect to the outer diameter of the pin 5k. If the optical sheets 7 to 9 are fixed with a small clearance with respect to the two pins 5i and 5k, excessive tension or wrinkles may occur when expanded and contracted due to temperature change, allowing the expansion and contraction of the optical sheets 7 to 9 to be absorbed by providing the hole for one pin having a circular shape with a high degree of position fixation and the hole for the other pin having an elliptical shape allowing for slight positional movement.

The reason that for the optical sheet 9, the hole 9b at the approximate center side has a circular shape, the hole 9c at the end part side has an elliptical shape, and for the optical sheets 8 and 7, the circular shape and the elliptical shape of are conversely provided is to make appropriate, for the outermost optical sheet 9 typically having a largest linear expansion coefficient, the clearance between the bottom base frame 2 and the optical sheet 9 by dispersing the expansion and contraction to the left and right ends with respect to the center close to the fixing region 9f.

Other optical sheets 8 and 7 are set with respect to the end part side because the linear expansion coefficient is not so large. Desirably, the optical sheet 7 is set with respect to the hole 7d because the fixing region 7f is close to the hole 7d. The optical sheet 8 may be set with respect to the center as with the optical sheet 9 because the position of the fixing region 8f is located near the middle of the holes 8c and 8d. Specifically, the hole 8c and the hole 8d may have a circular shape and an elliptical shape, respectively.

Figure 7:
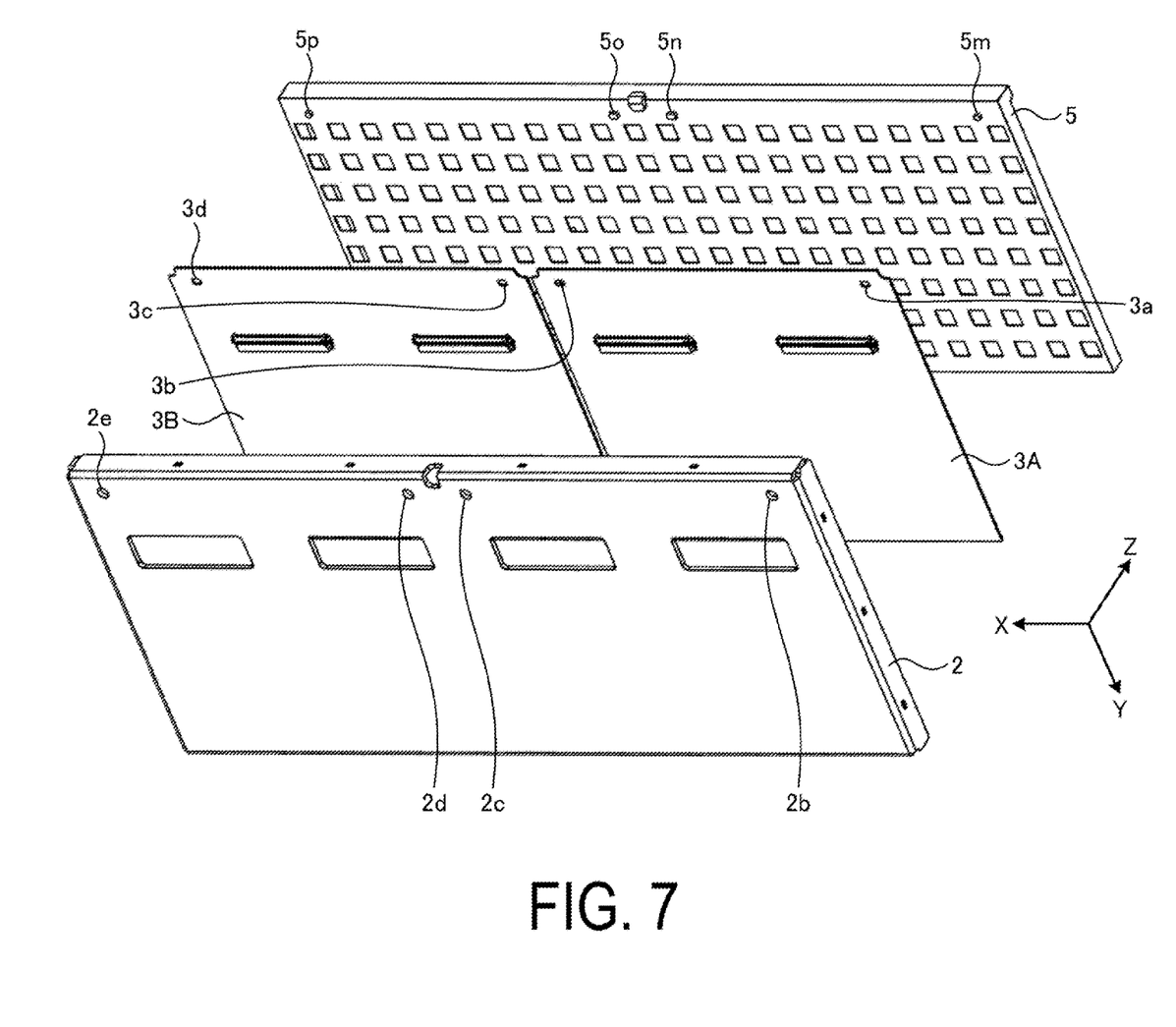
FIG. 7 is a perspective view illustrating a boss pin provided at the back surface of the reflector plate, a hole of a substrate and a hole of a bottom base frame.
Figure 8:
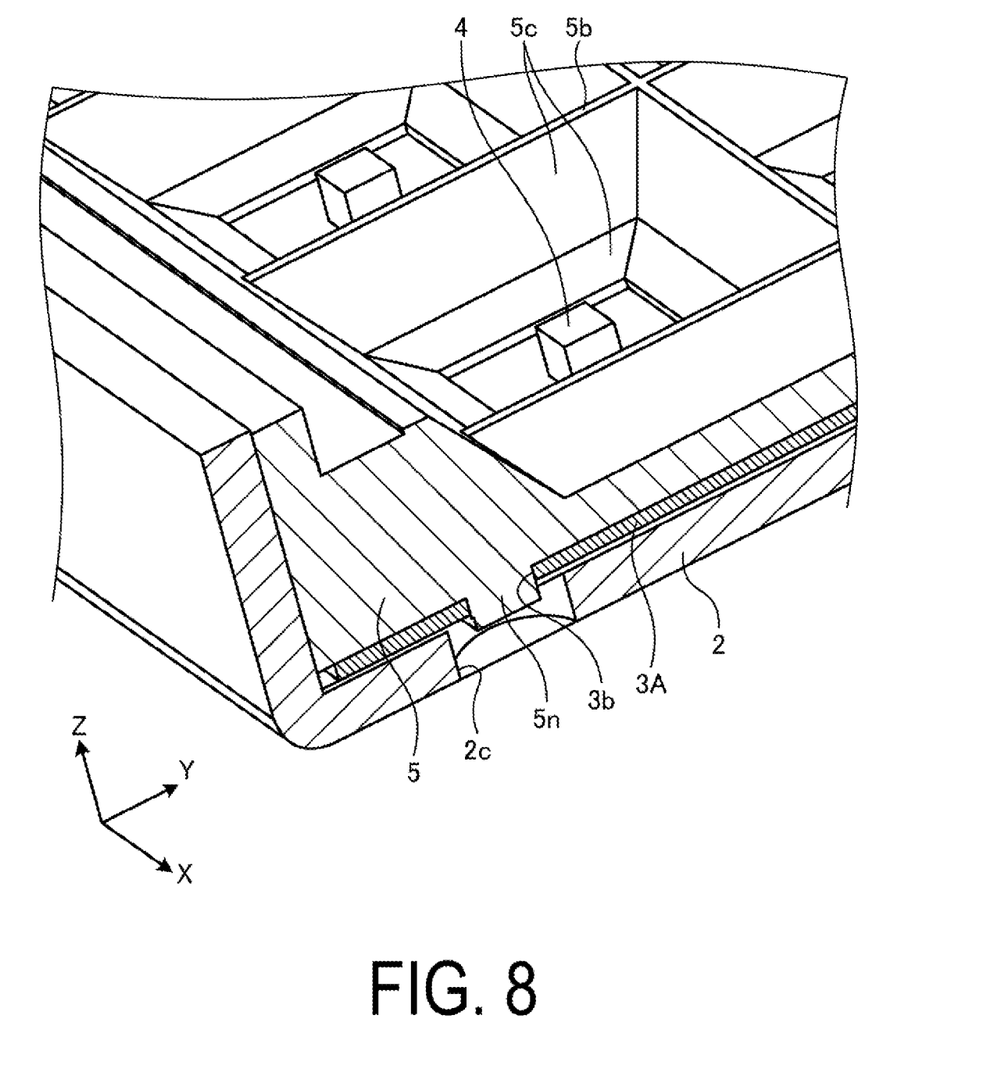
FIG. 8 is a cross-sectional perspective view partially illustrating a state of the boss pin of the reflector plate engaged with the hole of the substrate and the hole of the bottom base frame.

Next, FIG. 7 is a perspective view illustrating boss pins 5m to 5p provided at the back surface of the reflector plate 5, holes 3a to 3d provided at the substrates 3A and 3B, and holes 2b to 2e provided at the bottom base frame 2. FIG. 8 is a cross-sectional perspective view partially illustrating the boss pin 5n of the reflector plate 5 engaged with the hole 3b of the substrate 3A and the hole 2c of the bottom base frame 2.

In FIGS. 7 and 8, a plurality of boss pins 5m, 5n, 5o and 5p protruding to the substrates 3A and 3B side are provided at the end part of the surface of the reflector plate 5 at the substrates 3A and 3B side. Holes 3a, 3b, 3c and 3d engaging with the boss pins 5m, 5n, 5o and 5p are provided at positions corresponding to the boss pins 5m, 5n, 5o and 5p in the substrates 3A and 3B. Holes 2b, 2c, 2d and 2e engaging with the boss pins 5m, 5n, 5o and 5p are provided at positions corresponding to the boss pins 5m, 5n, 5o and 5p in the bottom base frame 2. The holes 2b, 2c, 2d and 2e of the bottom base frame 2 are desirably hidden from the external side by attaching a sticker and the like.

The boss pins 5m, 5n, 5o and 5p of the reflector plate 5 and the holes 3a, 3b, 3c and 3d of the substrates 3A and 3B engaging with the boss pins makes the positioning easy in an operation of assembling the reflector plate 5 and the substrates 3A and 3B to obtain a reflector plate assembly, allowing the workability to be improved. The boss pins 5m, 5n, 5o and 5p of the reflector plate 5 protruded from the holes 3a, 3b, 3c and 3d of the substrates 3A and 3B and the holes 2b, 2c, 2d and 2e of the bottom base frame 2 engaging with the boss pins 5m, 5n, 50 and 5p makes the positioning easy in an operation of assembling the reflector plate assembly and the bottom base frame 2 to obtain a bottom base frame assembly, allowing workability to be improved.

In particular, at the time of assembling the reflector plate 5 and the substrates 3A and 3B, positional displacement may cause abnormality in optical characteristics, and therefore it is necessary to match the position of the light source 4 on the substrates 3A and 3B and the center of the reflection surface of the reflector plate 5, but the operation is very simple because positioning is performed by simply putting the boss pins 5m, 5n, 5o and 5p into the holes 2b, 2c, 2d and 2e of the substrates 3A and 3B.

The embodiments of the disclosure are described above; however, the disclosure is not limited to the above-mentioned embodiments and may be modified in various ways without departing from the git of the invention.

As described above, a planar illumination device according to the embodiment includes a substrate having a planar shape or a curved shape provided with a plurality of light sources, a reflector plate disposed on the substrate and including a reflection surface surrounding the light source, and a plurality of optical sheets disposed at an emission side of the reflector plate. The reflector plate includes a step part including a plurality of flat parts having different heights in a thickness direction on one side of a frame of the reflector plate, each of the optical sheets includes a notch part obtained by cutting out part overlapping a fixing region of an end part of another optical sheet stacked at the emission side among the optical sheets, and the fixing region of the optical sheet is fixed to the flat part of the step part. This can provide a planar illumination device having easy assembling and allowing for being thinned. Improved workability can expect improvement in productivity such as reduction in takt time.

A structure where a tab (ear) is provided at an end part of an optical sheet and this tab is fixed to a bottom base frame and the like may damage the partially protruding tab but less causes the notch part to have such a problem. It is difficult to provide around the tab a hole engaging with the pin described later, but a hole is easily provided around the notch part. Further, since the fixing destination is the reflector plate, it is not necessary to perform special processing on the bottom base frame.

The fixing region is fixed to the flat part by a fixing member. This allows the optical sheet to be easily fixed.

A height of each flat part with each of the plurality of optical sheets fixed is obtained by subtracting a thickness of each fixing member used for fixing from a height of a surface of each optical sheet at an incident side among the plurality of optical sheets directly stacked. This allows the thickness of the entirety of the plurality of optical sheets to be minimized by cancelling the thickness of the fixing member.

The step part is provided at one side from an approximate center of a side provided with the step part in the reflector plate, and heights of the flat parts decrease toward outside from the approximate center side. This allows the outermost optical sheet typically having the largest linear expansion coefficient to be fixed at the approximate center of the side, the expansion and contraction to be dispersed to the left and right ends with respect to the center, and the clearance between the bottom base frame and the optical sheet to be made appropriate.

Pins protruding in a thickness direction are each provided at an approximate center of the side and near an end part of the side, the step part is sandwiched between the approximate center and the end part, and holes configured to engage with the pins are provided at positions corresponding to the pins in the optical sheet. This can use the pin as a target when placing the optical sheet at the time of assembling, improving the workability. The position of the optical sheet can be fixed by the two pins, allowing the positional displacement of the optical sheet to be prevented.

The step part is provided at one side from an approximate center of the side provided with the step part in the reflector plate, heights of the flat parts decrease toward outside from the approximate center side, pins protruding in a thickness direction are each provided at the approximate center of the side and near an end part of the side, the step part is sandwiched between the approximate center and the end part, and holes configured to engage with the pins are provided at positions corresponding to the pins in the optical sheet. Of the plurality of optical sheets, the optical sheet having a largest linear expansion coefficient and disposed at an outermost side has a hole of the holes provided at the approximate center side of the side having a circular shape with a predetermined clearance with respect to an outer diameter of the pins and has a hole of the holes provided at an end part side of the side having an elliptical shape elongated in an extending direction of the side with a predetermined clearance with respect to the outer diameter of the pins. Other optical sheets have a hole of the holes provided at the approximate center of the side having an elliptical shape elongated in the extending direction of the side with a predetermined clearance with respect to the outer diameter of the pins and have a hole of the holes provided at the end part side of the side having a circular shape with a predetermined clearance with respect to the outer diameter of the pins. This allows, for the optical sheet typically having the largest linear expansion coefficient and provided at the emission surface side, the expansion and contraction to be dispersed to the left and right ends with respect to the center and the clearance between the bottom base frame and the optical sheet to be made appropriate.

A plurality of boss pins protruding to a side of the substrate is provided at a surface of the reflector plate at the side of the substrate, and holes configured to engage with the boss pins are provided at positions corresponding to the boss pins in the substrate and a bottom base frame. This makes, in the operation of assembling the reflector plate and the substrate to obtain the reflector plate assembly and the operation of assembling the reflector plate assembly and the bottom base frame to obtain the bottom base frame assembly, the positioning easy, allowing the workability to be improved.

The disclosure is not limited to the embodiments described above. A configuration obtained by appropriately combining the above-mentioned components is also included in the disclosure. Further effects and modification examples can be easily derived by a person skilled in the art.

Thus, a wide range of aspects of the disclosure is not limited to the embodiment described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device, comprising:
 a substrate having a planar shape or a curved shape, a plurality of light sources being disposed on the substrate;
 a reflector plate disposed on the substrate and having a reflection surface surrounding the light sources; and
 a plurality of optical sheets disposed at an emission side of the reflector plate, wherein
 the reflector plate includes flat parts on one side of a frame of the reflector plate,
 the optical sheets respectively include a fixing region,
 the fixing region of the optical sheets is fixed to the flat parts,
 the flat parts on the side are sandwiched between both sides respectively provided with a pin protruding in a thickness direction, and
 the optical sheets are provided with holes at positions corresponding to the pins to engage with the pins.

2. The planar illumination device according to claim 1, wherein the flat parts are provided at a position protruding from the frame of the reflector plate in the thickness direction.

3. The planar illumination device according to claim 1, wherein the fixing region is fixed to the flat parts by a fixing member.

4. The planar illumination device according to claim 3, wherein
 the reflector plate has a step part including a plurality of the flat parts having different heights in the thickness direction, and
 a height of each flat part with each of the plurality of optical sheets fixed is obtained by subtracting a thickness of each fixing member used for fixing from a height of a surface of each optical sheet at an incident side among the plurality of optical sheets directly stacked.

5. The planar illumination device according to claim 1, wherein
 the flat parts are provided at one side from an approximate center in a side provided with the flat parts in the reflector plate, and
 heights of the flat parts decrease toward outside from an approximate center side.

6. The planar illumination device according to claim 1, wherein
 each of the optical sheets has notch parts obtained by cutting out part overlapping the fixing region of another optical sheet of the optical sheets stacked at the emission side.

7. The planar illumination device according to claim 1, wherein
 of the plurality of optical sheets, the optical sheet having a largest linear expansion coefficient has a hole of the holes provided at the approximate center side of the side having a circular shape with a predetermined clearance with respect to an outer diameter of the pins and has a hole of the holes provided at an end part side of the side having an elliptical shape elongated in an extending direction of the side with a predetermined clearance with respect to the outer diameter of the pins.

8. The planar illumination device according to claim 7, wherein the optical sheet having a largest linear expansion coefficient among the plurality of optical sheets is disposed at an outermost side.

9. The planar illumination device according to claim 1, wherein
 of the plurality of optical sheets, optical sheets other than the optical sheet having a largest linear expansion coefficient have a hole of the holes provided at the approximate center side of the side having an elliptical shape elongated in the extending direction of the side with a predetermined clearance with respect to an outer diameter of the pins and have a hole of the holes provided at the end part side of the side having a circular shape with a predetermined clearance with respect to the outer diameter of the pins.

10. The planar illumination device according to claim 1, wherein
 a plurality of boss pins protruding to a side of the substrate is provided at a surface of the reflector plate at the side of the substrate, and
 holes configured to engage with the boss pins are provided at positions corresponding to the boss pins in the substrate and a bottom base frame.

11. A planar illumination device, comprising:
 a substrate having a planar shape or a curved shape, a plurality of light sources being disposed on the substrate;
 a reflector plate disposed on the substrate and having a reflection surface surrounding the light sources; and
 a plurality of optical sheets disposed at an emission side of the reflector plate, wherein
 the reflector plate includes a step part including a plurality of flat parts having different heights in a thickness direction on one side of a frame of the reflector plate,
 the optical sheets respectively include notch parts obtained by cutting out part overlapping a fixing region of an end part of another optical sheet of the optical sheets stacked at the emission side,
 the fixing region of the optical sheets is fixed to the flat parts of the step part, and
 the step part is provided at one side from an approximate center in a side provided with the step part in the reflector plate, and heights of the flat parts decrease toward outside from an approximate center side.

* * * * *